May 5, 1970  F. F. HAMILTON  3,509,960
METHOD AND APPARATUS FOR AIRBORNE SEISMIC EXPLORATION
Filed June 20, 1968
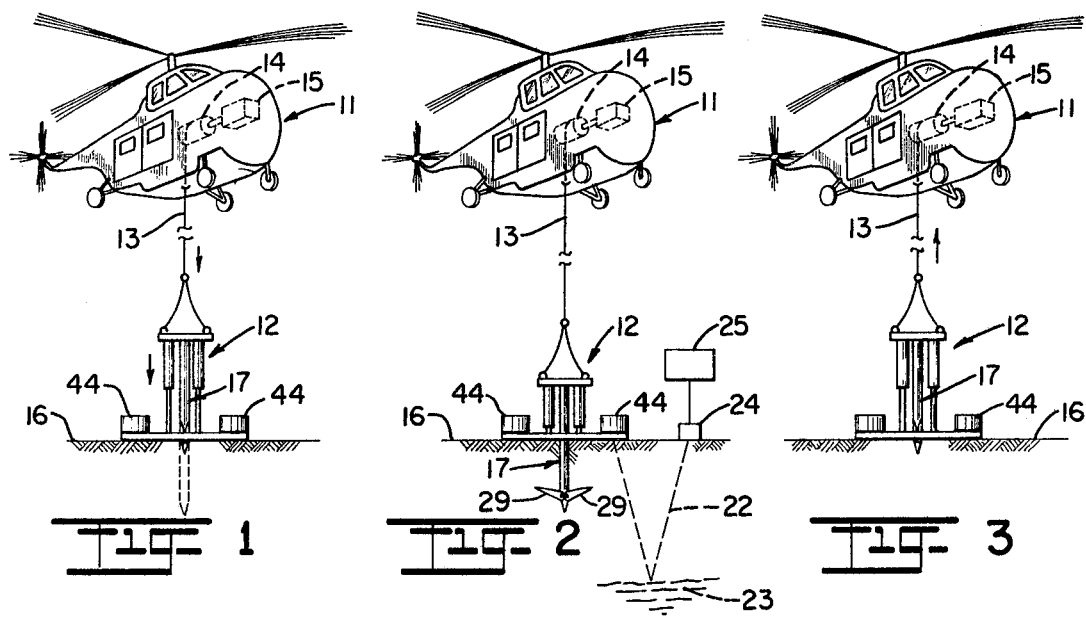
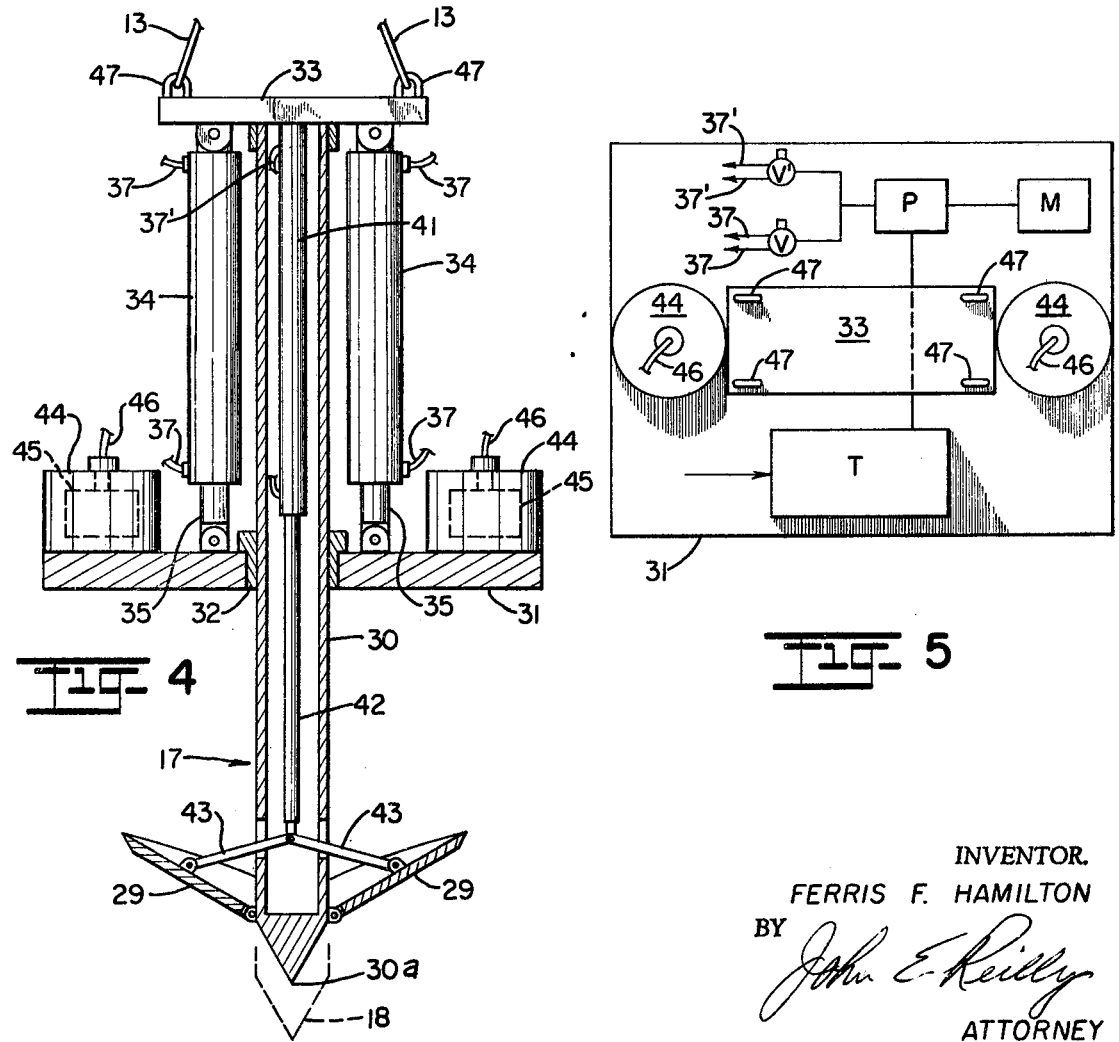
INVENTOR.
FERRIS F. HAMILTON
BY John E. Reilly
ATTORNEY

United States Patent Office 3,509,960
Patented May 5, 1970

3,509,960
METHOD AND APPARATUS FOR AIRBORNE SEISMIC EXPLORATION
Ferris F. Hamilton, 320 High St., Denver, Colo. 80218
Filed June 20, 1968, Ser. No. 738,572
Int. Cl. G01v 1/02
U.S. Cl. 181—.5   6 Claims

ABSTRACT OF THE DISCLOSURE

In a method and apparatus for seismic operation, a seismic energy source is constructed and arranged to be supported in a depending manner from a cable carried by a helicopter and is gradually lowered to rest on the earth's surface at each selected location while the helicopter hovers above. Means are provided for positively anchoring the seismic energy source to the earth's surface in order to impart a seismic input into the earth and is activated by remote control from the helicopter. Following each seismic input, the anchor is removed and the source is lifted and flown to the next location where the procedure is repeated.

---

This invention relates to a novel and improved method and apparatus for seismic exploration utilizing helicopters or like aircraft and a surface type seismic energy source which is supported and controlled from the aircraft for an essentially continuous airborne seismic operation; and further relates to a method and means for anchoring the energy source to the earth for each seismic operation.

In the past, seismic exploration has generally been conducted with land vehicles which transport the seismic equipment such as the seismic energy source, geophones and recorders to a location. Seismic sources presently in use are of a variety of types including explosives, hydraulic and electromagnetic vibrators, or weight drops. In each case, when the seismic source is activated to generate seismic waves, the reflected waves are detected by the geophones, the mechanical energy converted into electrical energy, and recorded by a recorder system. The equipment is then moved or transported to each next location in succession.

A particular difficulty in using land vehicles is in transporting the heavier seismic equipment into and between inaccessible locations, such as, swamps or forest areas; and while some attempt has been made in the past to employ aircraft in seismic explorations, for the most part this has been restricted to moving the pick-up and recording instruments to each location for detecting the seismic waves or moving portable seismic drills, because of the extreme weight of the seismic input equipment.

Thus an important factor in transporting and placing a seismic energy input source on the earth's surface by helicopter or other aircraft is that the equipment and ancillary equipment must be comparatively light in weight; yet, to be effective in use the source must direct its energy into the earth without the heavy weight or load customarily employed either as a part of or in direct association with the energy source.

Accordingly, it is an object of this invention to provide a simple and efficient method and apparatus for airborne seismic exploration wherein a lightweight energy source can be anchored to the earth's surface for release of its energy into the earth with maximum coupling, is quickly releasable and rapidly transportable between locations.

Another object of this invention is to provide a new and improved method and apparatus for fully airborne seismic exploration which is capable of reaching otherwise inaccessible locations.

It is still a further object of this invention to provide an airborne surface contact energy seismic source particularly suitable for use in a combination with a helicopter and of being activated by remote control wherein reduction in weight of the energy source is compensated for by positively but releasably anchoring the source to the earth's surface at each selected location.

In accordance with the present invention there is provided a novel and improved seismic exploration method and apparatus which includes suspension of the surface contact, seismic energy source by cable means preferably from a helicopter. Helicopters are particularly suitable because of their ability to hover above each location as well as to provide electric power supply and other remote control capabilities. Following suspension the source assembly is lowered by the craft into contact with the earth's surface either by decreasing the craft elevation or by raising and lowering a cable from which the source is suspended by operation of a winch in the craft. The source assembly is then secured to the earth's surface by driving an anchor member downwardly from the assembly into the earth and in such a way as to draw the surface-contacting portion of the assembly against the earth's surface. The seismic input source is then activated preferably by remote control from the helicopter to generate a seismic surface input while the helicopter is hovering above the location. After each seismic generation the anchor member is retracted from the earth's surface and the assembly lifted and carried to another location by the craft where the procedure is repeated.

Other objects, advantages and capabilities of the present invention will become more apparent as the following description proceeds taken in conjunction with the drawings, in which:

FIG. 1 is a generally schematic elevation view depicting the surface contact seismic source assembly being carried by a helicopter to a particular location and lowered to the ground and a preferred form of retractable anchor for the assembly is shown in dotted form in its extended position.

FIG. 2 is a generally schematic elevation view depicting the assembly in the anchored position with the supporting helicopter hovering above and the activation of the seismic energy source to generate waves which are picked up by conventional pick-up and recorder devices.

FIG. 3 is a generally schematic elevation view of the assembly after the anchor has been retracted from the earth as a preliminary to lifting by the helicopter to a next succeeding location.

FIG. 4 is an elevation view partially in section of the surface contact anchor assembly shown in FIGS. 1, 2 and 3; and FIG. 5 is a top plan view of the assembly shown in FIG. 4.

Referring now to the drawings in FIGS. 1 to 3, there is schematically shown a seismic exploration system and procedure embodying the features of the present invention which will first be described generally followed by a more detailed description, and as shown includes an aircraft 11 which in the preferred form is a helicopter having a seismic source assembly 12 suspended therefrom by a cable 13. The seismic source assembly 12 may be flown to each location by the helicopter and then suspended from the cable as shown and lowered toward the earth; or the assembly may first be attached to the end of the cable while resting on the ground, raised to an elevated position and flown to the next location in a depending towed manner. A motor driven winch 14 may be provided in the craft 11 for raising and lowering the assembly 12 from the aircraft and an electric power source and control box represented at 15 is located in the aircraft. There are currently available a variety of helicopters having a suitable electric power source capability such as the 204–B helicopter CFCBK which will provide electric power for use with control switches in the aircraft remote from the seismic source assembly 12. The assembly may thus be lowered from the aircraft by elevating or lowering the aircraft or by controlling the motor driven winch 14, although the former is preferred.

After the helicopter 11 has reached the particular location it will hover above the location and the assembly 12 is gradually lowered from an elevated position to a ground contact position on the earth's surface designated 16. An anchor member 17 to be hereinafter described in detail is preferably mounted on the assembly 12 and is driven downwardly into the earth to an extended earth-penetrating position, as is generally depicted in dash lines 18 in FIG. 1, while the helicopter is hovering above and its stroke is controlled in such a way as to positively draw the assembly 12 down against the earth in a manner described more fully hereinafter. A seismic source, hereafter described more fully, is mounted on the assembly and is activated to generate a seismic input into the earth. As depicted by dash lines 22 in FIG. 2, the seismic waves generated and transmitted into the earth are reflected from the lower subsurface structure 23 to one or more pick-up devices 24 and recorders 25 in the usual manner. The recorder and pick-up devices may be transported to the location in a conventional manner, such as by a land vehicle, but in the preferred airborne operation of the present invention also may be transported to each location by helicopter.

After the seismic source has been activated and the testing completed, the anchor 17 is retracted, as shown in FIG. 3, followed by lifting the seismic input assembly and flying it by helicopter to the next location where the same sequence is carried out in conducting another seismic test.

Referring now to FIGS. 4 and 5, the surface contact seismic source assembly as shown is comprised of a generally flat base or lower platform member 31 having a substantially flat undersurface and having the retractable anchor 17 which is in the shape of a spear or stake and is shown as being constructed of a generally cylindrical tube or hollow shaft 30 having a solid pointed portion 30a at its lower end arranged for downward extension through a guide sleeve or bushing 32 located in the platform. The shaft is supported from the platform for movement from a raised position as shown in FIG. 1 downwardly into the earth to a fully extended position as shown in dash lines at 18 in FIGS. 1 and 4. The shaft 30 is attached at its upper end to the undersurface of an upper horizontal support plate 33 with a pair of drive members extending parallel to and on opposite sides of the shaft 30 between the lower platform 31 and the upper plate 33. Each drive member includes a double-acting cylinder 34 and a piston 35 which reciprocates in the cylinder to raise and lower the anchor shaft 30. For the purpose of illustration, where hydraulically operated cylinder units are provided, pressure and return lines 37 are connected to opposite ends of the drive cylinders 34 and lead from a regulated source of supply which may be suitably defined by a pump P, reservoir or tank T, motive source M for the pump, and a pilot operated valve V to control the flow of fluid to and from opposite ends of the cylinders 34. Here the valve V together with the power source M may be controlled either from the aircraft or from the ground as desired.

A central drive member is located within hollow shaft shaft 30 for controlling the pivotal movement of blades 29 and includes an upper cylinder 41 and plunger 42 for selectively actuating the finger member 29 at the lower end of the shaft 30. The members 29 are hinged at their lower ends on opposite sides of the shaft 30 for laterally outward pivotal movement from the body and, to this end, pivotally interconnected links 43 extend from a central portion of each member 29 to the bottom of the plunger 42 in order to pivot the legs outwardly and inwardly. The latter may be done in response to reciprocal movement of the plunger under the control of pressure and return lines 37′ leading from a second control valve V′. When the shaft 30 is driven into the ground by retraction of the piston rods 35 through their cylinders 34, the finger members 29 are held flat against the outer surface of the shaft 30. After substantial penetration to the extended position, shown dotted in FIG. 1, the shaft is raised slightly to the position shown and simultaneously the fingers 29 are pivoted to the position shown in FIG. 4 thereby drawing the base 31 downwardly against the earth's surface.

The seismic source is preferably defined by a pair of vibrators 44 disposed at opposite ends of the base 31 and each contains an electromagnetic or hydraulically operated driving member 45 to generate vibrational impulses which are transmitted into the earth. A line 46 is shown leading to each of the members 45 and also may extend to other required apparatus on the base to be controlled remotely from the helicopter, depending on the type of seismic source being employed. The lower extremities of the suspension cable 13 are attached to the top of the upper platform 33 using lugs 47 at each corner thereof, and the cable 13 extends upwardly to the helicopter to suspend the entire surface contact assembly from the helicopter in a balanced manner.

In the detailed operation operation and sequence, after the assembly 12 has been lowered by the aircraft 11 to rest at location 16 (FIG. 1) it is then positively anchored to the earth. This is accomplished by first actuating cylinders 34 which retract the associated pistons 35 to draw plate 33 downwardly toward platform 31 and at the same time shaft 30 is positively driven downwardly into the earth to a preselected lowermost position indicated at 18. Cylinders 34 are then actuated through their regulated source to provide a reverse flow in the cylinder to push the pistons out of the cylinders and thereby raise shaft 30 and at the same time cylinder 41 is actuated to drive its piston 42 downwardly to spread blades 29 so that blades 29 are moved laterally of the shaft 30 to an extended position inclined at an angle to the horizontal, and this action pulls the base 31 against the earth's surface. Upon anchoring the base as described, the seismic source 45 is energized to generate the seismic input.

To release the anchor 17 cylinders 34 are again actuated and their pistons 35 are retracted into the cylinder to drive shaft 30 downwardly and at the same time cylinder 41 is actuated to retract its piston 42 to pivot the blades inwardly to their original position in close proximity to shaft 30. Fluid pressure to the cylinders 34 is reversed to force the pistons 35 outwardly thereby causing the shaft 30 to be removed from the ground to the upper retracted position while cylinder 41 and piston 42 act to hold the blades 29 in the retracted position. After shaft 30 has been fully retracted (FIG. 3) the assembly 12 is ready to be elevated and carried by the aircraft to the next location. In a conventional and well-known manner the pick-ups 24 and recorders 25 are transported, preferably by helicopter lift, to each new location.

While various means can be employed to control activation both of the seismic source and of the anchor, one preferred way is to provide an electrically actuated type such as electric solenoid operated valves on the base 31 which may be supplied with electric power through an electrical cable extending upwardly with the support cable to the control box 15 in the helicopter so that personnel in the helicopter may control the activation of the seismic source. In a similar fashion, the anchor may be controlled from the helicopter. As a suitable alternative to the conductive lines in the cable 13, a radio control in the helicopter may be used. The drive for the anchor may also be of variety of types inculding a linear electric motor actuated by the electric source in the helicopter.

Although the seismic source has been illustrated somewhat generally and a hydraulic or electromagnetic vibrator has been referred to as one preferred form it is understood that it may be of a variety of seismic sources such as an explosive type or other forms of known mechanical vibrators. Further a weight drop may also be employed on an assembly which supports the weight above the earth and which may be activated or released from a control in the aircraft. A variety of earth anchors are also suitable for positively drawing the platform against the earth, such as, for example, an auger.

Although the present invention has been described with a certain degree of particularity, it is understood that the present disclosure has been made only by way of example and that changes in details of structure and system components may be made without departing from the spirit and scope thereof.

What is claimed is:

1. A method for airborne seismic exploration comprising the steps of flying a weighted surface contact seismic energy source assembly having an anchor thereon to a preselected location by an aircraft, gradually lowering the assembly from an elevated airborne position to a position at rest on the earth's surface while hovering over the location, releasably anchoring the assembly by driving the anchor into the earth, imparting a seismic input into the earth's surface by activating said surface contacting assembly, releasing the anchor from the earth followed by lifting and flying the assembly to each next preselected location.

2. A method as set forth in claim 1 further characterized by the drawing of the assembly firmly against the earth's surface in releasably anchoring the assembly in place prior to activating the assembly.

3. A method as set forth in claim 1 including the step of electronically controlling the seismic input from a point remote from the assembly.

4. A method as set forth in claim 1 including the driving of an earth-penetrating device downwardly from the assembly to anchor the assembly to the earth's surface.

5. A method as set forth in claim 1 including the further step of flying a seismic pick-up and recorder apparatus to said location simultaneously with said source assembly, and receiving the seismic waves produced from the source with said pick-up and recorder apparatus.

6. A method for airborne seismic exploration comprising the steps of suspending a weighted surface contact seismic energy source in an elevated position above the earth's surface, carrying the assembly to a preselected location, gradually lowering the assembly into a position at rest on the earth's surface, releasably anchoring the assembly in place on the earth, activating the assembly to generate a seismic surface input, releasing the anchor from the earth followed by lifting and carrying the assembly to the next preselected location in succession.

References Cited

UNITED STATES PATENTS

| | | | |
|---|---|---|---|
| 2,717,656 | 9/1955 | Bannister | 340—15.5 |
| 3,062,315 | 11/1962 | Herzog | 340—15.5 |
| 2,691,939 | 10/1954 | Hintz | 340—7 |
| 2,772,746 | 12/1956 | Merten | 340—15.5 |

RICHARD A. FARLEY, Primary Examiner

C. E. WANDS, Assistant Examiner

U.S. Cl. X.R.

340—15.5